United States Patent
Lee et al.

(10) Patent No.: US 9,544,633 B2
(45) Date of Patent: Jan. 10, 2017

(54) DISPLAY DEVICE AND OPERATING METHOD THEREOF

(71) Applicant: LG ELECTRONICS INC., Seoul (KR)

(72) Inventors: Seungshin Lee, Seoul (KR); Taekwon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 179 days.

(21) Appl. No.: 14/531,444

(22) Filed: Nov. 3, 2014

(65) Prior Publication Data

US 2015/0373393 A1   Dec. 24, 2015

(30) Foreign Application Priority Data

Jun. 23, 2014  (KR) .................. 10-2014-0076365

(51) Int. Cl.
| | | |
|---|---|---|
| G10L 21/00 | (2013.01) | |
| H04N 21/422 | (2011.01) | |
| G08C 23/04 | (2006.01) | |
| H04N 5/44 | (2011.01) | |
| G08C 17/02 | (2006.01) | |
| G10L 15/22 | (2006.01) | |

(52) U.S. Cl.
CPC ........ *H04N 21/42203* (2013.01); *G08C 17/02* (2013.01); *G08C 23/04* (2013.01); *H04N 5/4403* (2013.01); *H04N 21/42207* (2013.01); *H04N 21/42221* (2013.01); *G08C 2201/31* (2013.01); *G08C 2201/93* (2013.01); *G10L 2015/223* (2013.01); *H04N 21/42222* (2013.01); *H04N 2005/4428* (2013.01); *H04N 2005/4432* (2013.01)

(58) Field of Classification Search
None
See application file for complete search history.

(56) References Cited

U.S. PATENT DOCUMENTS

| | | | | |
|---|---|---|---|---|
| 8,665,829 | B2* | 3/2014 | Park ..................... | G08C 17/02 370/331 |
| 9,082,018 | B1* | 7/2015 | Laska ................ | G06K 9/00711 |
| 9,154,828 | B2* | 10/2015 | Hsu ................... | H04N 21/42226 |
| 2012/0044136 | A1* | 2/2012 | Kim ..................... | H04N 5/4403 345/156 |
| 2013/0008832 | A1 | 1/2013 | Valerio | |
| 2013/0082826 | A1* | 4/2013 | Chandra ................ | G08C 17/00 340/12.5 |
| 2013/0290001 | A1* | 10/2013 | Yun ......................... | G10L 15/00 704/275 |

(Continued)

FOREIGN PATENT DOCUMENTS

| | | | |
|---|---|---|---|
| EP | 2 731 349 A1 | 5/2014 | |
| EP | 2 765 782 A1 | 8/2014 | |

*Primary Examiner* — Satwant Singh
(74) *Attorney, Agent, or Firm* — Dentons US LLP

(57) ABSTRACT

An operating method of a display device is provided. The method includes: recognizing, by the display device, a user's function control voice for controlling a function of a peripheral device; controlling, by the display device, the peripheral device to perform a function corresponding to the recognized function control voice in the peripheral device through a remote control device; and providing, by the display device, a control state of the peripheral device representing that the function corresponding to the recognized function control voice is performed in the peripheral device.

21 Claims, 18 Drawing Sheets

(56) References Cited

U.S. PATENT DOCUMENTS

| | | | |
|---|---|---|---|
| 2014/0136205 A1 | 5/2014 | Jang et al. | |
| 2014/0218621 A1* | 8/2014 | Kim | H04N 5/4403 348/734 |
| 2014/0280879 A1* | 9/2014 | Skolicki | H04L 69/28 709/224 |
| 2015/0172585 A1* | 6/2015 | Park | H04N 5/4403 348/730 |
| 2016/0092738 A1* | 3/2016 | Laska | G06K 9/00711 382/103 |

* cited by examiner

DISPLAY DEVICE AND OPERATING METHOD THEREOF

CROSS-REFERENCE TO RELATED APPLICATIONS

This application claims the benefit of Korean Patent Application No. 10-2014-0076365, filed on Jun. 23, 2014 entitled "DISPLAY DEVICE AND OPERATING METHOD THEREOF", which is hereby incorporated by reference in its entirety into this application.

BACKGROUND

The present disclosure relates to a display device and an operating method thereof.

In general, an IR blaster function is a function for transmitting an IR signal for controlling a peripheral device to a light reception unit thereof by receiving a control signal in a predetermined format. Such an IR blaster function may be applied to a display device or may be used through a display device.

Typically, in order to control a peripheral device, an integrated IR micro computer in a display device outputs input information to an external wired IR cable. The information outputted to the wired IR cable may be received by an IR reception unit in a peripheral device through an accessory equipped with an IR blaster function and through this, may control the peripheral device. Accordingly, a user needs to purchase an accessory equipped with an additional IR blaster function to control a peripheral device.

Moreover, even when an IR blaster function is applied to a remote control device such as a remote controller, it maintains a sleep state when not in use due to a battery issue. Thus, since there is no way of receiving a control command from a peripheral device such as a set-top box by a display device, the IR blaster function may not be utilized completely.

Furthermore, since products equipped with a typical IR blaster function perform one-way IR communication with a peripheral device such as a set-top box, when the peripheral device is not controlled properly due to the IR directivity, there is no way of recognizing whether IR signal is received from a remote controller properly. Therefore, in order to eliminate the directivity restriction, a multiple IR module is equipped. However, as a multiple IR module is equipped, the costs of products equipped with an IR blaster function are increased.

Moreover, for people with visual impairments, accurate feedback on whether a peripheral device is controlled normally cannot be provided.

SUMMARY

Embodiments provide a display device for controlling a peripheral device without a product equipped with an additional IR blaster function by using an IR blaster function equipped in a remote control device.

Embodiments also provide a device for easily providing a control state of a peripheral device to a user through a user's remote voice recognition.

In one embodiment, provided is an operating method of a display device. The method includes: recognizing, by the display device, a user's function control voice for controlling a function of a peripheral device; controlling, by the display device, the peripheral device to perform a function corresponding to the recognized function control voice in the peripheral device through a remote control device; and providing, by the display device, a control state of the peripheral device representing that the function corresponding to the recognized function control voice is performed in the peripheral device.

In another embodiment, a display device includes: an interface unit performing a communication with a remote control device and a peripheral device; a voice recognition unit recognizing a user's voice; and a control unit controlling the peripheral device to perform a function corresponding to a user's function control voice for controlling a function of the peripheral device in the peripheral device through the remote control device and providing a control state of the peripheral device representing whether the function corresponding to the recognized function control voice is performed in the peripheral device.

According to various embodiments of the present invention, a peripheral device may be controlled without a product equipped with an additional IR blaster function by using an IR blaster function equipped in a remote control device. Thus, costs may be reduced.

Additionally, a control state of a peripheral device is easily provided to a user through a user's remote voice recognition. Thus, user's convenience may be increased.

DETAILED DESCRIPTION OF THE EMBODIMENTS

Hereinafter, embodiments of the present invention will be described in more detail with reference to the accompanying drawings. The suffixes "module" and "unit" for components used in the description below are assigned or mixed in consideration of easiness in writing the specification and, do not have distinctive meanings or roles by themselves.

Figure 1:
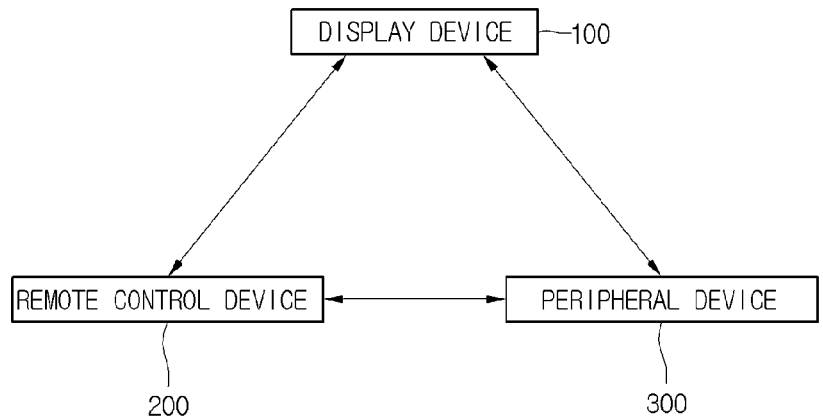
FIG. 1 is a view illustrating a voice control system according to an embodiment of the present invention.

FIG. 1 is a view illustrating a voice control system according to an embodiment of the present invention.

The voice control system 1 includes a display device 100, a remote control device 200, and a peripheral device 300.

The display device 100 may recognize a user's voice and may then generate a control command corresponding to the recognized user's voice to transmit the generated control command to the remote control device 200.

The display device 100, as an artificial display device adding a computer supporting function to a broadcast receiving function, may have an easy-to-use interface such as a handwriting type input device, a touch screen, or a spatial remote controller. Moreover, with the support of a wired or wireless internet function, the image display may perform a function such as e-mail, web browsing, internet banking, or online game by accessing internet or computers. A standardized general-purpose OS may be used for such various functions.

The display device 100 may be one of a network TV, an HBBTV, a smart TV, an LED TV, or an OLED TV, and if necessary, may be applied to a smartphone.

The remote control device 200 may remotely control a function of one of the display device 100 and the peripheral device 300.

The remote control device 200 may include an IR blaster function. That is, the remote control device 200 may generate an IR signal corresponding to a control command received from the display device 100 and may then transmit the generated IR signal to the peripheral device 300. The remote control device 200 may control a function of the peripheral device 300 through IR signal.

The remote control device 200 may be one of a space remote controller, a smartphone, and a smart pad but is not limited thereto.

The peripheral device 300 may receive an IR signal from the remote control device 200 and may perform a function corresponding to the received IR signal.

The peripheral device 300 may be connected to the display device 100 through a wired/wireless method.

According to an embodiment of the present invention, the peripheral device may be one of a set-top box (STB), a digital video recorder (DVR), a blue-ray player but is not limited thereto.

Figure 2:
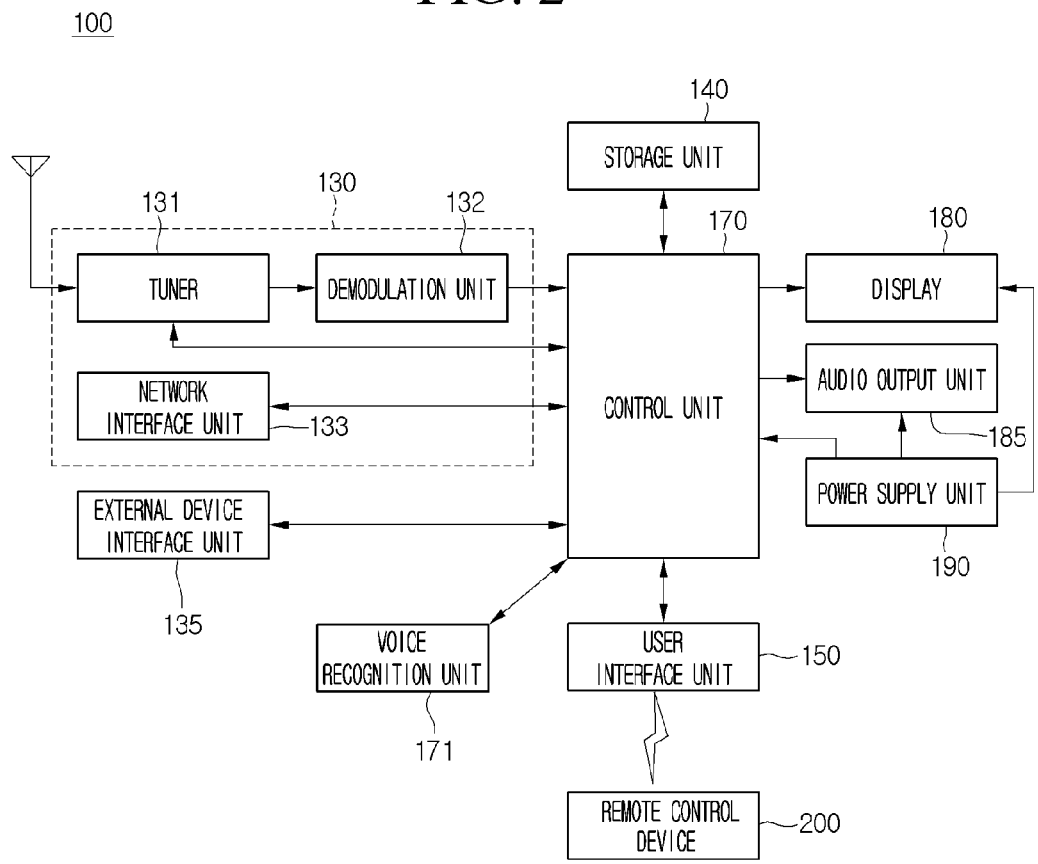
FIG. 2 is a block diagram illustrating a configuration of a display device according to an embodiment of the present invention.

FIG. 2 is a block diagram illustrating a configuration of a display device according to an embodiment of the present invention.

Referring to FIG. 2, the display device 100 may include a broadcast reception unit 130, an external device interface unit 135, a storage unit 140, a user input interface unit 150, a control unit 170, a voice recognition unit 171, a display unit 180, an audio output unit 185, and a power supply unit 190. Moreover, the broadcast reception unit 130 may include a tuner 131, a demodulation unit 132, and a network interface 133.

Moreover, the external device interface 135 receives an application or an application list in an adjacent external device and delivers it to the control unit 170 or the storage 140.

The network interface unit 133 may provide an interface to connect the display device 100 to a wired/wireless network including an internet network. The network interface unit 133 may transmit ore receive data to or from another user or another electronic device via an accessed network or another network linked to an accessed network.

Moreover, the network interface unit 133 may transmit part of contents data stored in the display device 100 to a selected user or a selected electronic device among pre-registered other users or other electronic devices.

The network interface unit 133 may access a predetermined webpage via an accessed network or another network linked to an accessed network. That is, the network interface unit 1300 may transmit or receive data to or from a corresponding server by accessing a predetermined webpage via a network.

Then, the network interface unit 133 may receive contents or data provided from a contents provider or a network operator. That is, the network interface unit 133 may receive contents such as movies, advertisements, games, VOD, and broadcast signals provided from a contents provider or a network provider via a network and information relating thereto.

Additionally, the network interface unit 133 may receive update information and update files of firmware provided from a network operator and may transmit data to an internet or contents provider or a network operator.

The network interface unit 133 may select and receive a desired application among applications open to the public via a network.

The storage unit 140 may store a program for each signal processing and control in the control unit 170 and may store signal processed images, voices, or data signals.

Additionally, the storage unit 140 may perform a function for temporarily storing images, voices or data signals inputted from the external device interface unit 135 or the network interface unit 133, and may store information on a predetermined image through a channel memory function.

The storage unit 140 may store an application or an application list inputted from the external device interface unit 135 or the network interface unit 133.

The display device 100 may play a contents file (for example, a video file, a still image file, a music file, a document file, and an application file) stored in the storage unit 140 and may then provide it to a user.

The user input interface unit 150 may deliver a signal that a user inputs to the control unit 170 or may deliver a signal from the control unit 170 to a user. For example, the user input interface unit 150 may receive and process a control signal for power on/off, channel selection, and screen setting from a remote control device 200 or may transmit a control signal from the control unit 170 to the remote control device 200 according to various communication methods such as Bluetooth, Ultra Wideband (WB), ZigBee, Radio Frequency (RF) and IR communication methods.

Additionally, the user input interface unit 150 may deliver a control signal inputted from a local key (no shown) such as a power key, a channel key, a volume key, and a setting key to the control unit 170.

An image signal image-processed in the control unit 170 may be inputted to the display unit 180 and may then be displayed as an image corresponding to a corresponding image signal. Additionally, a video signal image-processed by the control unit 170 may be inputted to an external output device through the external device interface unit 135.

A voice signal processed in the control unit 170 may be outputted to the audio output unit 185. Additionally, a sound signal processed by the control unit 170 may be inputted to an external output device through the external device interface unit 135.

Besides that, the control unit 170 may control overall operations in the display device 100.

Moreover, the control unit 170 may control the TV 100 through a user command inputted through the user input interface unit 150 or an internal program, or may download an application or an application list that a user wants into the display device 100 by accessing a network.

The control unit 170 may allow both information on a channel that a user selects and processed image or voice to be outputted through the display unit 180 or the audio output unit 185. The audio output unit 185 may include a speaker for outputting audio.

Additionally, the control unit 170 allows video signals or audio signals from an external device such as a camera or a camcorder, which are inputted through the external device interface unit 135, to be outputted through the display unit 180 or the audio output unit 184 according to an external device image playback command received through the user input interface unit 150.

Furthermore, the control unit 170 may control the display unit 180 to display an image. For example, a broadcast image inputted through the tuner 131, an external input image outputted through the external device interface unit 135, an image inputted through a network interface unit, or an image stored in the storage unit 140 may be controlled to be displayed on the display unit 180. In this case, an image displayed on the display unit 180 may be a still image or a video, or may be a 2D image or a 3D image.

Additionally, the control unit 170 may perform a control to play contents stored in the display device 100, received broadcast contents, or external input contents inputted from the outside, and the contents may be in various forms, for example, a broadcast image, an external input image, an audio file, a still image, an accessed web screen, and a document file.

The voice recognition unit 171 may recognize a voice by receiving a user's voice. The voice recognition unit 171 may recognize a user's trigger voice and function control voice. The trigger voice and function control voice will be described later.

The voice recognition unit 171 may include a mike for receiving a user's voice, a beamforming unit for removing surrounding noise other than a received user's voice, and a voice recognition control unit for generating a control command on the basis of a voice having surrounding sound removed.

The control command may be a command for controlling a function of the remote control device 200 or a function of the peripheral device 300 corresponding to a recognized user's voice. The control command may be transmitted to the remote control device 200 through an RF transceiver included in the user input interface unit 150.

The display unit 180 may convert the video signal, data signal, and OSD signal that are processed by the control unit 170 or the video signal and data signal that are received through the external device interface unit 135 into R, G, B signals, respectively, so as to generate driving signals.

Moreover, the display device 100 shown in FIG. 2 is just one embodiment, and thus some of shown components may be integrated, added, or omitted according to the specification of the actually implemented display device 100.

That is, at least two components may be integrated into one component or one component may be divided into more than two components, if necessary. Additionally, a function performed in each block is used to describe an embodiment of the present invention and its specific operation or device does not limit the scope of the present invention.

According to another embodiment of the present invention, unlike those shown in FIG. 2, the display device 100 may not include the tuner 131 and the demodulation unit 132 and may receive an image through the network interface unit 133 or the external device interface unit 135 and may then play it.

For example, the display device 100 may be divided into an image processing device such a set-top box for receiving broadcast signals or contents according to various networks and a contents playback device playing contents inputted from the image processing device.

In this case, an operating method of a display device described below according to an embodiment of the present invention may be performed by one of the image processing device such as a separated set-top box or the contents playback device including the display unit 180 and the audio output unit 185 in addition to the display device 100 described with reference to FIG. 2.

Then, a remote control device according to an embodiment of the present invention will be described with reference to FIGS. 3 to 5.

Figure 3:
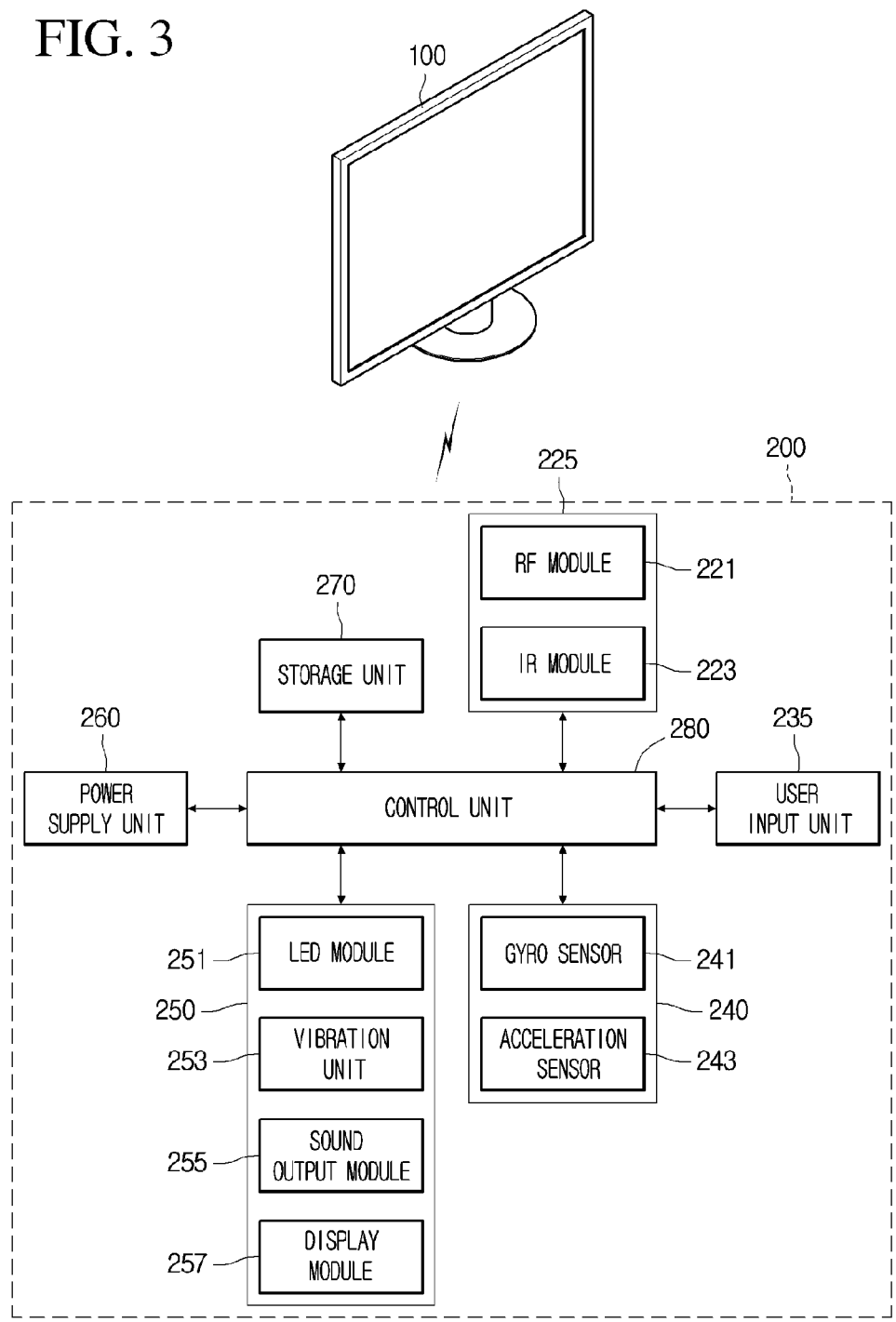
FIG. 3 is a block diagram of a remote control device according to an embodiment of the present invention.

FIG. 3 is a block diagram of a remote control device according to an embodiment of the present invention. FIG. 4 is an actual configuration of a remote control device according to an embodiment of the present invention. FIG. 5 is a view illustrating a method of controlling a remote control device according to an embodiment of the present invention.

First, referring to FIG. 3, the remote control device 200 may include a wireless communication unit 225, a user input unit 234, a sensing unit 240, an output unit 250, a power supply unit 260, a storage unit 270, and a control unit 290.

Referring to FIG. 3, the wireless communication unit 225 may transmit/receive a signal to/from the display device 100 and the peripheral device 300 according to the above-mentioned embodiments of the present invention.

The remote control device 200 may include an RF module 221 transmitting/receiving a signal to/from the display device 100 according to the RF communication standard and an IR module 223 transmitting/receiving a signal to/from the display device 100 according to the IR communication standard.

Moreover, the remote control device 200 may transmit a signal containing information on a movement of the remote control device 200 to the display device 100 through the RF module 221.

Furthermore, the remote control device 200 may receive a signal that the display device 100 transmits through the RF module 221 and if necessary, may transmit a command on power on/off, channel change, and volume change to the display device 100 through the IR module 223.

The user input unit 235 may be configured with a keypad, a button, a touch pad, or a touch screen. A user may manipulate the user input unit 235 and may input a command relating to the display device 100 to the remote control device 200. When the user input unit 235 is equipped with a hard key button, a user may input a command relating to the display device 100 to the remote control device 200 through a push operation of the hard key button.

When the user input unit 235 is equipped with a touch screen, a user may input a command relating to the display device 100 to the remote control device 200 through a soft key touch of the touch screen. Additionally, the user input unit 235 may include various kinds of input means that a user manipulates, for example, a scroll key or a jog key, and this embodiment does not limit the scope of the present invention.

The sensing unit 240 may include a gyro sensor 241 or an acceleration sensor 243 and the gyro sensor 241 may sense information on a movement of the remote control device 200.

For example, the gyro sensor 231 may sense information on a movement of the remote control device 200 on the basis of x, y, and z axes and the acceleration sensor 243 may sense information on the movement speed of the remote control device 200. Moreover, the remote control device 200 may further include a distance measurement sensor and thus may sense a distance to the display unit 180 of the display device 100.

The output unit 250 may output an image or voice signal corresponding to a manipulation of the user input unit 235 or corresponding to a signal that the display device 100 transmits. A user may recognize whether the user input unit 235 is manipulated or whether the display device 100 is controlled through the output unit 250.

For example, the output unit 250 may include an LED module 252 flashing when the user input unit 235 is manipulated or a signal is transmitted from the display device 100 through the wireless communication module 225, a vibration module 253 generating vibration, a sound output module 255 outputting sound, or a display module 257 outputting an image.

Moreover, the power supply unit 260 supplies power to the remote control device 200 and when the remote control device 200 does not move for a predetermined time, stops power supply, so that power waste may be reduced. The power supply unit 260 may resume the power supply when a predetermined key equipped at the remote control device is manipulated.

The storage unit 270 may store several types of programs and application data necessary for a control or operation of the remote control device 200. If the remote control device 200 transmits a signal wirelessly through the display device 100 and the RF module 221, the remote control device 200 and the display device 100 transmit/receive signal through a predetermined frequency band.

The control unit 280 of the remote control device 200 may store information on a frequency band for transmitting/receiving a signal wirelessly to/from the display device 100 paired with the remote control device 200 and may then refer it.

The control unit 280 may control general matters relating to a control of the remote control device 200. The control unit 280 may transmit to the display device 100 through the wireless communication unit 225, a signal corresponding to a predetermined key manipulation of the user input unit 235 or a signal corresponding to a movement of the remote control device 200 that the sensing unit 240 senses.

Again, FIG. 4 will be described.

Figure 4:
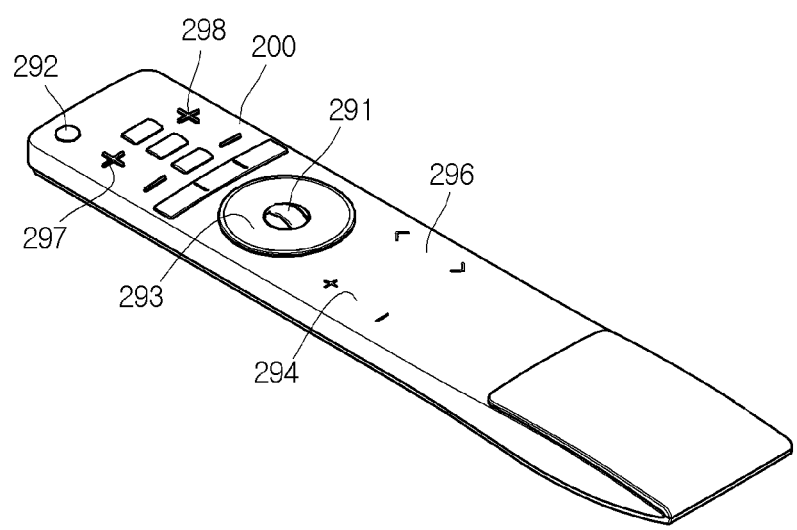
FIG. 4 is a block diagram illustrating an actual configuration of a remote control device according to an embodiment of the present invention.

Referring to FIG. 4, for example, the space remote controller 201 may include an okay key 291, a menu key, a four direction key 293, a channel adjustment key 294, and a volume adjustment key 296. For example, the okay key 291 is used for selecting a menu or item. The menu key 292 is used for displaying a predetermined menu. The four direction key 293 is used for moving a pointer or indicator up/down/left/right. The channel adjustment key 294 is used for adjusting a channel up/down. The volume adjustment key 296 is used for adjusting volume up/down.

Additionally, the space remote controller 201 may further include a back key 297 and a home key 298. For example, the back key 297 is used for moving to a previous screen and the home key 298 is used for moving to a home screen.

Moreover, as shown in the drawing, the ok key 291 may further perform a scroll function. For this, the ok key 291 may be realized in a wheel key form. That is, when the ok key 291 is pressed, it is used for a corresponding menu or item selection. When the ok key 291 is scrolled up/down, display screen scrolling or list page switching may be performed.

In more detail, while an image larger than the size of a display is displayed on the display unit 180, as the ok key 291 for corresponding image search is scrolled, an image area not displayed on the current display is displayed on the display.

For another example, when a list page is displayed on the display unit 180, as the ok key 291 is scrolled, the previous or next page of the current page may be displayed. Such a scroll function may be equipped as an additional key not the ok key 291.

Moreover, in relation to the four direction key 293, as shown in the drawing, up/down/left/right keys are respectively disposed in four directions in a circular type. Moreover, a touch input for the four direction key 293 may be possible. For example, when there is a touch operation from an up key to a down key in the four direction key 293, a set function may be inputted or performed according to a corresponding touch input.

Figure 5:
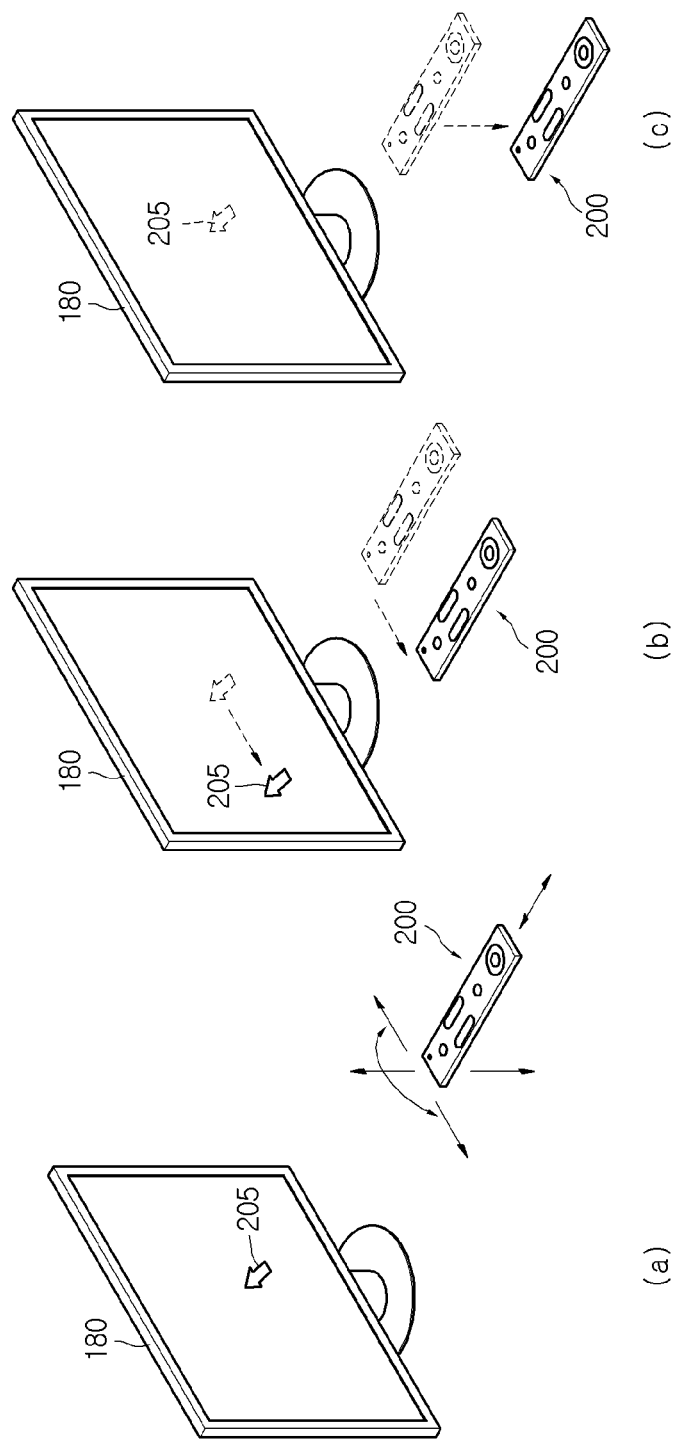
FIG. 5 is a view illustrating a method of controlling a remote control device according to an embodiment of the present invention.

FIG. 5 is a view illustrating an image display method of an image display device by using a remote control device according to an embodiment of the present invention.

As shown in FIG. 5(*a*), a pointer 205 corresponding to the remote control device 200 is exemplarily displayed on a display unit 180.

A user may move the remote control device 200 up and down or right and left or rotate it. The pointer 205 displayed on the display unit 180 of the image display device corresponds to the movement of the remote control device 200. The remote control device 200 may be called a spatial remote controller because as shown in the drawing, the corresponding pointer 205 is moved and displayed according to the movement on a 3D space.

As shown in FIG. 5(*b*), when a user moves the remote control device 200 to the left, the pointer 205 displayed on a display unit 180 exemplarily moves to the left according to thereto.

Information on the movement of the remote control device 200 sensed through a sensor of the remote controller 200 is transmitted to the image display device. The TV may calculate the coordinates of the pointer 205 from the information on the movement of the remote control device 200. The image display device may display the pointer 205 in correspondence to the calculated coordinates.

As shown in FIG. 5(*c*), while a specific button is pressed in the remote control device 200, a user moves the remote controller 200 away from the display unit 180 exemplarily. Due to this, a selected area corresponding to the pointer 205 in the display unit 180 may be zoomed in and enlarged.

On the contrary, when a user moves the remote control device 200 close to the display unit 180, a selected area corresponding to the pointer 205 in the display unit 180 may be zoomed out and reduced.

Moreover, when the remote control device 200 is away from the display unit 180, a selected area is zoomed out, and when the remote control device 200 is closer to the display unit 180, a selected area is zoomed in.

Furthermore, while a specific button is pressed in the remote control device 200, the recognition of up and down or left and right movements may be eliminated. That is, when the remote control device 200 moves away from or closer to the display unit 180, the up, down, left, and right movements are not recognized and only the back and forth movements are recognized. While a specific button is not pressed in the remote control device 200, the pointer 205 moves only according to the up, down, left, and right movements of the remote control device 200.

Moreover, a moving speed or direction of the pointer 205 may correspond to a moving speed or direction of the remote control device 200.

Furthermore, the pointer 205 in this specification means an object displayed on the display unit 180 in correspondence to an operation of the remote control device 200. Accordingly, the besides the arrow form shown as the pointer 205, various forms of objects are available. For example, an object form may be a point, a cursor, a prompt, and a think outline. Also, the pointer 205 may be displayed in correspondence to on point of the horizontal axis and the vertical axis on the display unit 180, and also may be displayed in correspondence to a plurality of points such as a line or a surface.

Then, an operating method of a voice control system according to an embodiment of the present invention will be described with reference to FIGS. 6 to 19.

Figure 6:
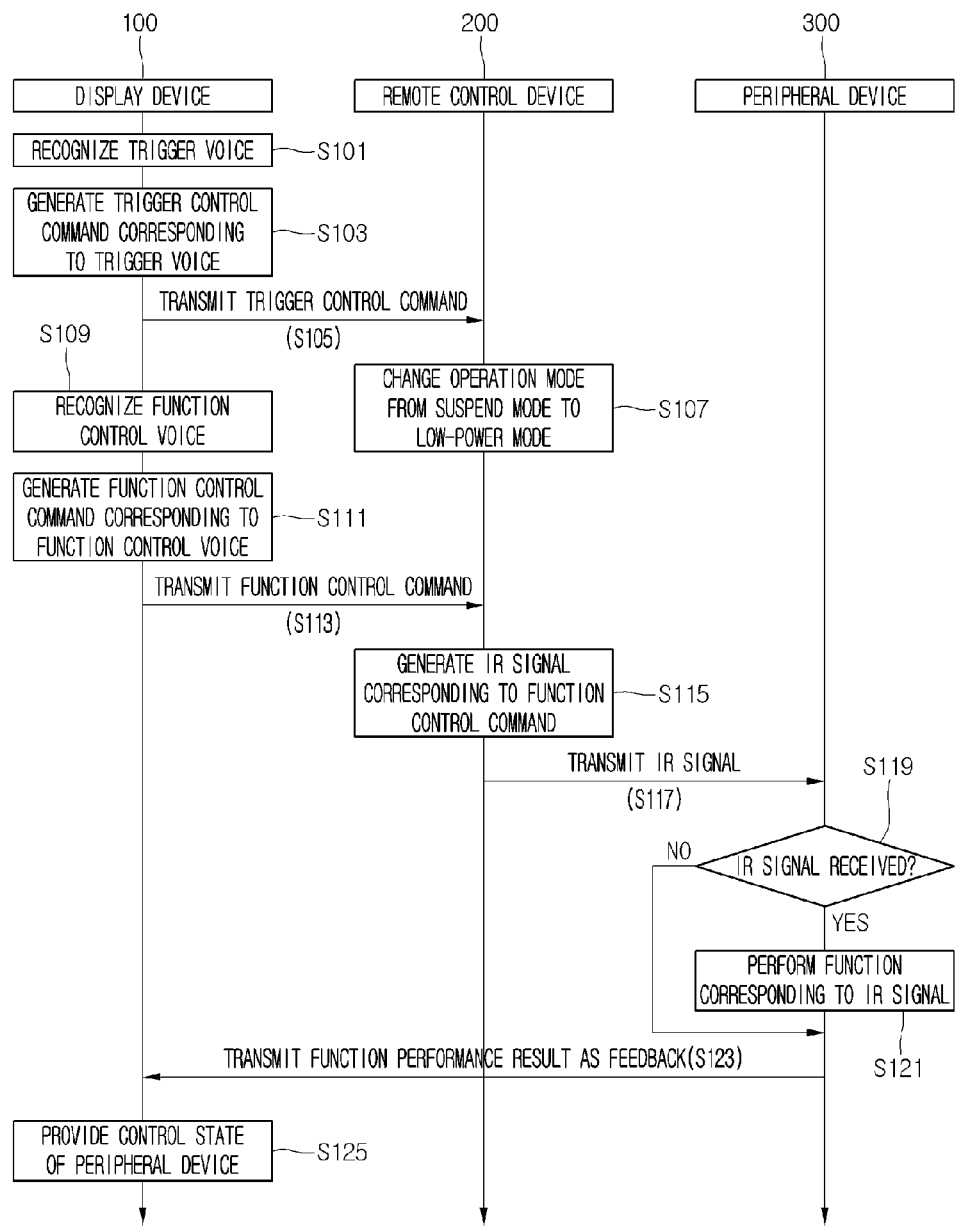
FIG. 6 is a ladder diagram illustrating an operating method of a voice control system according to an embodiment of the present invention.

First, FIG. 6 is a ladder diagram illustrating an operating method of a voice control system according to an embodiment of the present invention.

The voice recognition unit 171 of the display device 100 recognizes a user's trigger voice in operation S101. According to an embodiment of the present invention, a user's trigger voice may be a voice for activating a voice recognition function of the display device 100. For example, a state of the voice recognition unit 171 of the display device 100 may include an inactive state and an active state. The inactive state of the voice recognition unit 171 may be a state for not recognizing a voice other than a user's trigger voice and only recognizing a user's trigger voice. The active state of the voice recognition unit 171 may be a state for recognizing a user's voice corresponding to a function of the display device 100 as a user's trigger voice is recognized.

The voice recognition unit 171 of the display device 100 may be in an inactive state usually and when a user's trigger voice is recognized, may change into an active state. The voice recognition unit 171 in an active state may recognize a voice other than a user's trigger voice and the control unit 170 of the display device 100 may perform a function of the display device 100 corresponding to the recognized voice.

According to another embodiment of the present invention, a trigger voice may be both a voice for activating the voice recognition function of the display device 100 and a voice that is the basis for changing an operation mode of the remote control device 200 from a suspend mode into a sniff mode. This will be described in more detail.

According to an embodiment of the present invention, a trigger voice may be a voice set to the default. For example, the trigger voice may be a voice command such as <HI TV> and <HI JUDY>. Herein, <JUDY> may be a user's name registered to an account of the display device 100.

According to another embodiment of the present invention, the trigger voice may vary according to a user's setting.

According to an embodiment of the present invention, the voice recognition unit 171 may be disposed on one of the upper end center, left and right sides, and lower center of the display device 100 but is not limited thereto.

According to an embodiment of the present invention, the voice recognition unit 171 is disposed at the front of the display device 100 and may recognize a user's voice spaced a predetermined distance from the voice recognition unit 171. Herein, the predetermined distance may be about 3 m but is not limited thereto.

The control unit 170 of the display device 100 generates a trigger control command corresponding to the recognized trigger voice in operation S103 and transmits the generated trigger control command to the remote control device 200 in operation S105.

According to an embodiment of the present invention, the control unit 170 of the display device 100 may transmit a trigger control command to the RF module 221 of the remote control device 200 through the user input interface 150. For this, the user input interface unit 150 of the display device 100 may also include an RF module and may transmit a trigger control command to the RF module 221 of the remote control device 200 through RF communication.

According to an embodiment of the present invention, a trigger control command corresponding to a trigger voice may be a command for changing an operation mode of the remote control device 200. In more detail, a trigger control command may be a command for changing an operation mode of the remote control device 200 from a suspend mode into a sniff mode. The operation mode of the remote control device 200 may include a suspend mode, a sniff mode, a power-on mode, and a power-off mode.

The suspend mode of the remote control device 200, as a mode in which only some components of the remote control device 200 are activated, may be a mode in a state for receiving a trigger control command corresponding to a trigger voice from the display device 100. In more detail, in the suspend mode of the remote control device 200, the RF module 221 of the remote control device 200 may be activated and the remote control device 200 may receive a trigger control command through the RF module 221.

The suspend mode of the remote control device 200 may be a mode for receiving a control command corresponding to a user's function control voice from the display device 100 as waking up from a suspend mode periodically. The remote control device 200 operates in a suspend mode basically in the low-power mode of the remote control device 200. However, since the remote control device 200 wakes up to receive a control command periodically, unnecessary power consumption may be prevented.

The power-on mode of the remote control device 200 may mean a mode in which power is supplied to all components configuring the remote control device 200.

The power-off mode of the remote control device 200 may mean a mode in which power is not supplied to all components configuring the remote control device 200.

The control unit 280 of the remote control device 200 changes the operation mode of the remote control device 200 from a suspend mode into a low-power mode according to a trigger control command received from the display device 100 in operation S107.

Operation S101 to operation S107 will be described with reference to FIG. 7.

Figure 7:
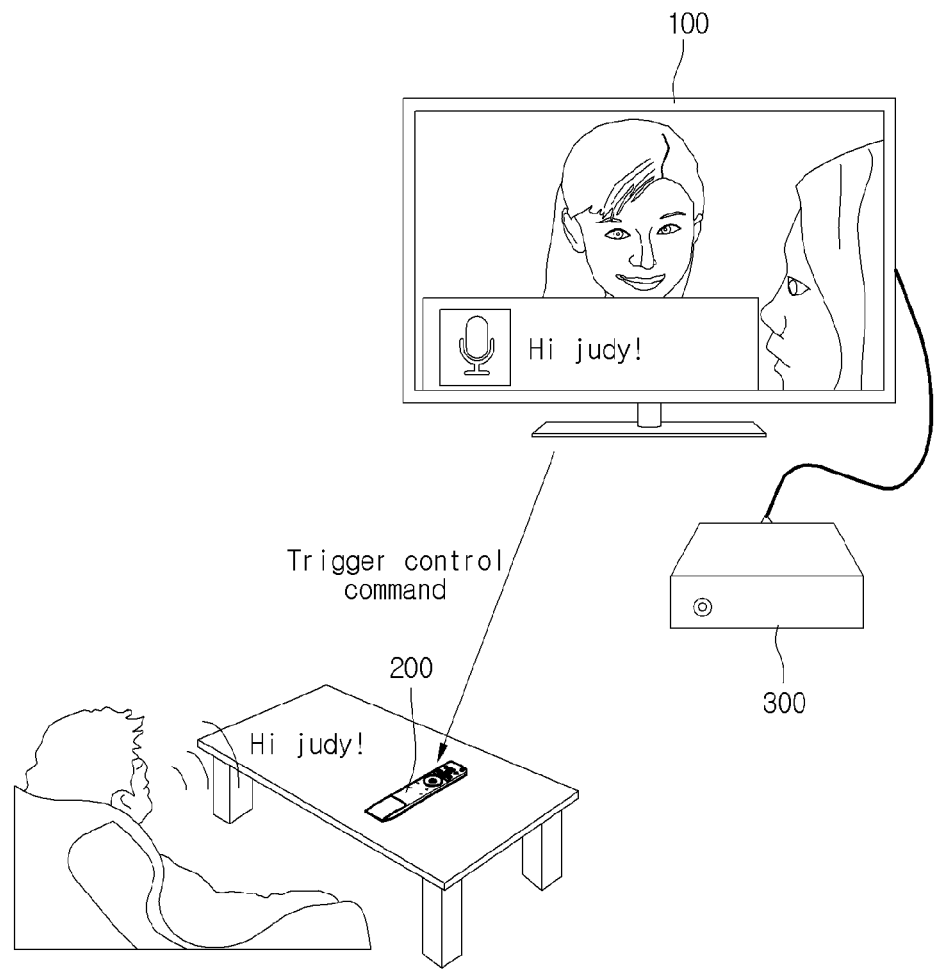
FIG. 7 is a view of changing an operation mode of a remote control device in response to a received user's trigger voice according to an embodiment of the present invention.

FIG. 7 is a view of changing an operation mode of a remote control device in response to a received user's trigger voice according to an embodiment of the present invention.

Hereinafter, it is assumed and described that the display device 100 is a smart TV, the remote control device 200 is a space remote controller, and the peripheral device 200 is a set-top box.

First, a user speaks a trigger voice, that is, <Hi judy>, while viewing media content through a smart TV. The smart tv may receive a user's trigger voice and may then transmit a trigger control command corresponding to the received trigger voice to a space remote controller.

Herein, the smart TV may convert a user's trigger voice recognized through the voice recognition unit 171 into a text and may then output it.

The space remote controller changes its operation mode from a suspend mode into a low-power mode according to a trigger control command received from the smart tv and then waits for receiving a function control command described later from the smart tv.

Again, FIG. 6 is described.

Then, the voice recognition unit 171 of the display device 100 recognizes a user's function control voice in operation S109.

According to an embodiment of the present invention, a user's function control voice may be a voice for controlling a function of the peripheral device 300. In more detail, a user's function control voice may be a voice for checking whether a function of the peripheral device 300 connected to the display device 100 is performed properly through the display device 100.

For example, when the peripheral device 300 is a set-top box, a function control voice may be a voice for changing a power state, a voice for changing a channel, and a voice for changing a volume.

When the function control voice is a voice for turning on/off the power of the peripheral device 300, it may be the voice command of <power off and power on> but this is just exemplary.

When the function control voice is a voice for channel change, it may be the voice command of <channel down, channel up, and tune to channel 11> but this is just exemplary. When the function control voice is a voice for volume control change, it may be the voice command of <volume up and volume down> but this is just exemplary.

The control unit 170 of the display device 100 generates a function control command corresponding to the recognized function control voice in operation S111.

According to an embodiment of the present invention, the function control command, as a command generated in correspondence to the recognized function control voice, may be a command for controlling a specific function of the peripheral device 300.

According to an embodiment of the present invention, the storage unit 140 of the display device 100 may match a user voice and a function control command and may then store it. For example, when a user's voice is a voice for requesting a channel change, the control unit 170 searches for a function control command corresponding to the voice for channel change recognized through the storage unit 140 and then generates the found function control command.

The control unit 170 of the display device 100 transmits the generated function control command to the remote control device 200 in operation S113.

According to an embodiment of the present invention, the control unit 170 may transmit the function control command to the RF module 221 of the remote control device 200 through an RF module (not shown) of the display device 100.

According to another embodiment of the present invention, the control unit 170 may transmit the function control command to a Bluetooth module (not shown) of the remote control device 200 through a Bluetooth module (not shown) in the display device 100.

The control unit 280 of the remote control device 200 generates an IR signal corresponding to a function control command received from the display device 100 in operation S115.

According to an embodiment of the present invention, the control unit 280 of the remote control device 200 may generate an IR signal proper for the IR format key of the peripheral device 300. The storage unit 270 of the remote control device 200 may store an IR format key corresponding to a function control command for each of a plurality of peripheral devices. The control unit 280 of the remote control device 200 may search for an IR format key corresponding to a function control command received through the storage unit 270 and may generate an IR signal on the basis of the found IR format key.

The control unit 280 of the remote control device 200 may transmit the generated IR signal to the peripheral device 300 in operation S117.

The control unit 280 of the remote control device 200 may transmit the generated IR signal to the peripheral device 300 through an IR communication method. In more detail, the control unit 280 of the remote control device 200 may transmit a generated IR signal to the peripheral device 300 through the IR module 223. For this, the peripheral device 300 also may include an IR module performing the same function as the IR module 223 of the remote control device 200.

According to an embodiment of the present invention, an IR signal may be a signal for controlling a function of the peripheral device 300 in response to a user's function voice.

The peripheral device 300 checks whether an IR signal is received from the IR module 221 of the remote control device 200 in operation S119.

If it is checked that the peripheral device 300 receives the IR signal, the peripheral device 300 performs its function corresponding to the IR signal received from the remote control device 200 in operation S121.

According to an embodiment of the present invention, a function of the peripheral device 300 may be one of a power state change such as power on/off, a channel change, and a volume change but is not limited thereto.

After performing a corresponding function or when it is checked that the IR signal is not received from the remote control device 200, the peripheral device 300 transmits a feedback representing a function performance result to the display device 100 in operation S123.

According to an embodiment of the present invention, when a function of the peripheral device 300 corresponding to an IR signal corresponds to a channel change function and it is checked that the peripheral device 300 receives an IR signal from the remote control device 200, the peripheral device 300 may transmit a feedback for a performance result of the channel change function to the display device 100. For example, when performing a channel change function corresponding to an IR signal, the peripheral device 300 may transmit a feedback representing that the channel change function is performed, to the display device 100.

Moreover, when it is checked that the peripheral device 300 does not receive an IR signal from the remote control device 200, the peripheral device 300 may transmit a feedback representing that the IR signal is not received, to the display device 100. Herein, when the peripheral device 300 does not receive an IR signal from the remote control device 200, this is the case that the direction of the remote control device 200 is twisted so that the peripheral device 300 cannot receive IR signal. That is, the transmission direction of an IR signal does not face the peripheral device 300 so that the peripheral device 300 cannot receive the IR signal.

For another example, when the peripheral device 300 does not receive an IR signal from the remote control device 200, this is the case that there is an object for blocking the transmission of an IR signal between the remote control device 200 and the peripheral device 300.

For another example, when the peripheral device 300 does not receive an IR signal from the remote control device 200, it may not transmit a feedback representing a function performance result.

For another example, when the peripheral device 300 receives an IR signal from the remote control device 200 but the intensity of the IR signal is weak so that a function of the peripheral device 300 cannot be performed, the peripheral device 300 may transmit a feedback representing that the intensity of the IR signal is weak to the display device 100.

The control unit 170 of the display device 100 may provide a control state of the peripheral device 300 on the basis of the feedback representing a function performance result received from the peripheral device 300 in operation S123.

According to an embodiment of the present invention, the control unit 170 of the display device 100 may output a control state of the peripheral device 300 visually or acoustically on the basis of the feedback representing a function performance result received from the peripheral device 300. In more detail, the control unit 170 may output a control state message representing that a function of the peripheral device 300 is performed normally according to a user's function control voice, through the display unit 180. The control unit 170 may output a voice representing that a function of the peripheral device 300 is performed normally according to a user's function control voice, through the audio output unit 185. The control unit 170 may output whether a function of the peripheral device 300 is performed normally according to a user's function control voice, through a message and voice.

Operation S109 to operation S125 are described with reference to FIGS. 8 to 20.

First, FIGS. 8 to 11 are views of providing a control state of a peripheral device by recognizing a user's voice for channel change according to an embodiment of the present invention.

Figure 8:
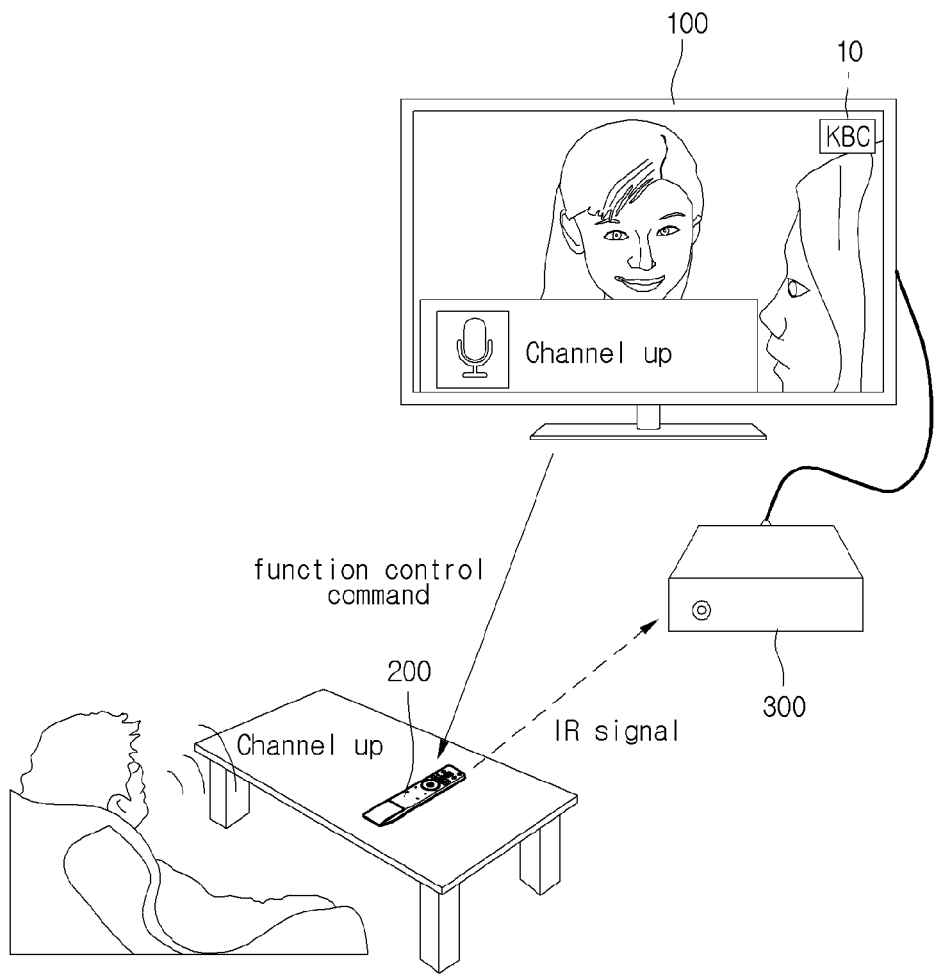
FIGS. 8 to 11 are views of providing a control state of a peripheral device by recognizing a user's voice for channel change according to an embodiment of the present invention.

First, referring to FIG. 8, a user speaks the function control voice of <channel up> to control a channel change function of the peripheral device 300. The display device 100 recognizes the spoken function control voice representing a channel change and then transmits a function control command corresponding to the recognized function control device to the remote control device 200. Here, the display device 100 may output a function control voice representing the recognized channel change through a screen.

The remote control device 200 generate an IR signal on the basis of the function control command for channel change received from the display device 100 and transmits the generated IR signal to the peripheral device 300.

When receiving an IR signal normally, the peripheral device 300 performs a channel change function corresponding to the IR signal and provides a performance result of the channel change function to the display device 100.

According to an embodiment of the present invention, the control unit 170 of the display device 100 may check whether the peripheral device 300 performs the channel change function through a logo detection method. In more detail, the display device 100 may detect a logo displayed on a playback screen of media content and may check whether the peripheral device 300 performs the channel change function according to whether the detected logo is changed. If the logo displayed on the playback screen of the media content is changed, the display device 100 may confirm that the peripheral device 300 performs the channel change function. If it is confirmed that the logo displayed on the playback screen of the media content is not changed, the display device 100 may confirm that the peripheral device 300 does not perform the channel change function.

According to an embodiment of the present invention, the control unit 170 of the display device 100 may check whether the logo is changed by comparing the capture images of media content in playback. For example, by comparing a logo included in a first capture image of media content and a logo included in a second capture image of media content after a predetermined time, it is checked whether the logo is changed. If the logo included in the first capture image of media content is identical to the logo included in the second capture image of media content after a predetermined time, the control unit 170 confirms that the peripheral device 300 does not perform the channel change function and if not, the control unit 170 conforms that the peripheral device 300 performs the channel change function.

Herein, the logo is for identifying a broadcaster and a content provider providing media content and may be displayed on a playback screen of media content.

As shown in FIG. 8, a <KBC> logo 10 is displayed at the right upper end of a playback screen of media content.

Figure 9:
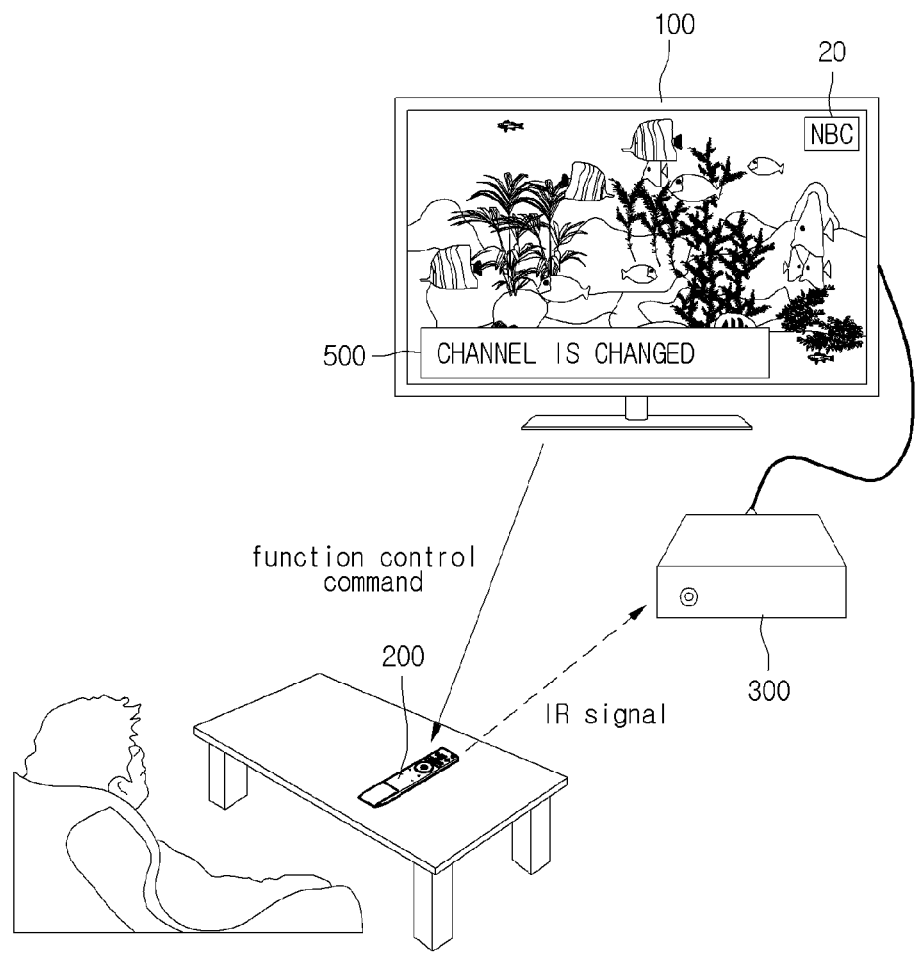

The display device 100 may confirm that the <KBC> logo 10 changes into a <NBC> logo 20 as shown in FIG. 9 through a logo detection method and also may confirm that the peripheral device 300 performs a channel change function corresponding to a user's function control voice.

According to another embodiment of the present invention, the display device 100 may capture a playback screen of media content and may then check whether the peripheral device 300 performs the channel change function. The control unit 170 of the display device 100 may obtain identification information of media content on the basis of a sample for some frames of media content in playback. The control unit 170 may capture a broadcast program in playback in real time and may transmit frames for the captured broadcast program to an automatic contents recognition (ACR) server. The ACR server may identify corresponding media content by using frames received from the display device 100 and may transmit identification information on the corresponding media content to the display device 100. The display device 100 may check whether the peripheral device 300 performs a channel change function through the identification information on media content received from the ACR server.

When the media content is a broadcast program, the identification information on media content may include the name and channel information of the broadcast program.

The display device 100 may receive channel information of a broadcast program from the ACR server and may check whether the peripheral device 300 performs a channel change function according to whether the received channel information of the broadcast program is changed.

As shown in FIG. 9, the display device 100 may display a channel change performance result of the peripheral device 300 through a message window 500. When the peripheral device 300 performs the channel change function, the display device 100 may display the message window 500 and also may play the changed media content according to a channel change on a screen.

Figure 10:
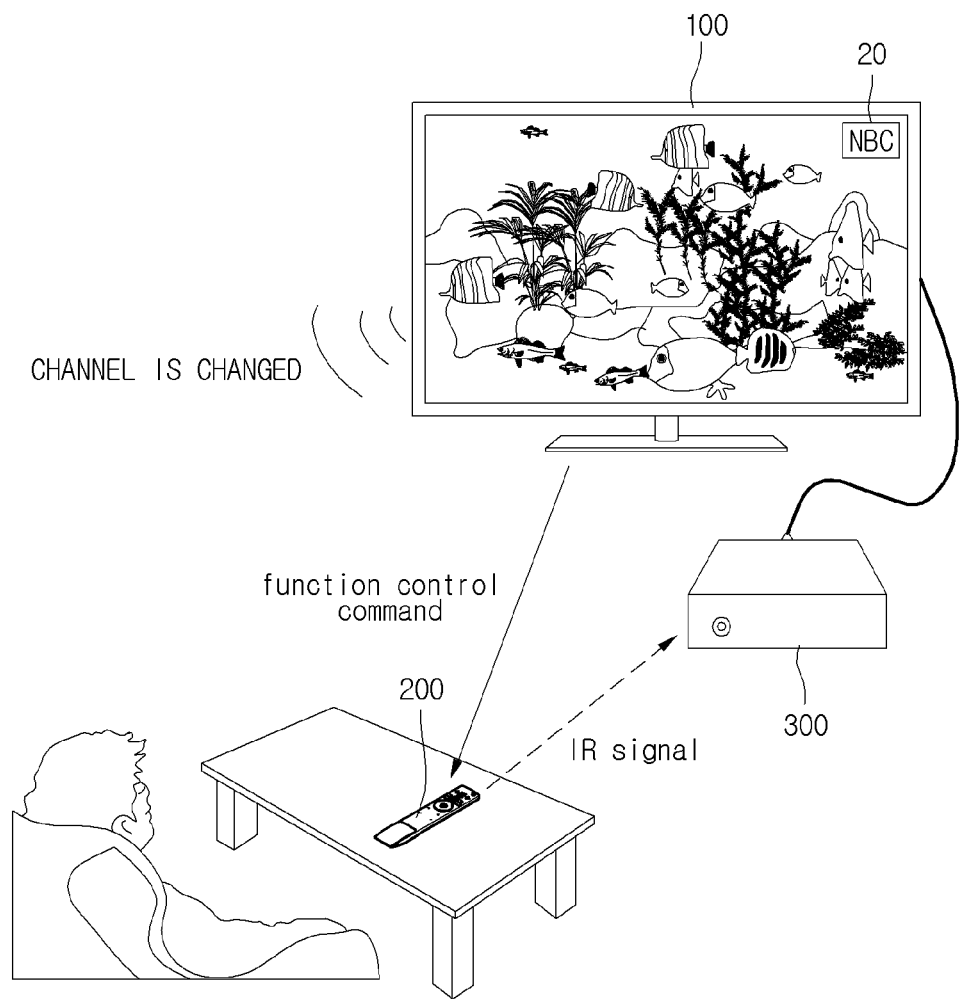

The display device 100 may output the channel change performance result of the peripheral device 300 through voice. That is, as shown in FIG. 10, the display device 100 may output the voice of <channel is changed> through the audio output unit 185. The display device 100 may output the voice of <channel is changed> through the audio output unit 184 and may play a media content changed according to a channel change on a screen at the same time.

Figure 11:
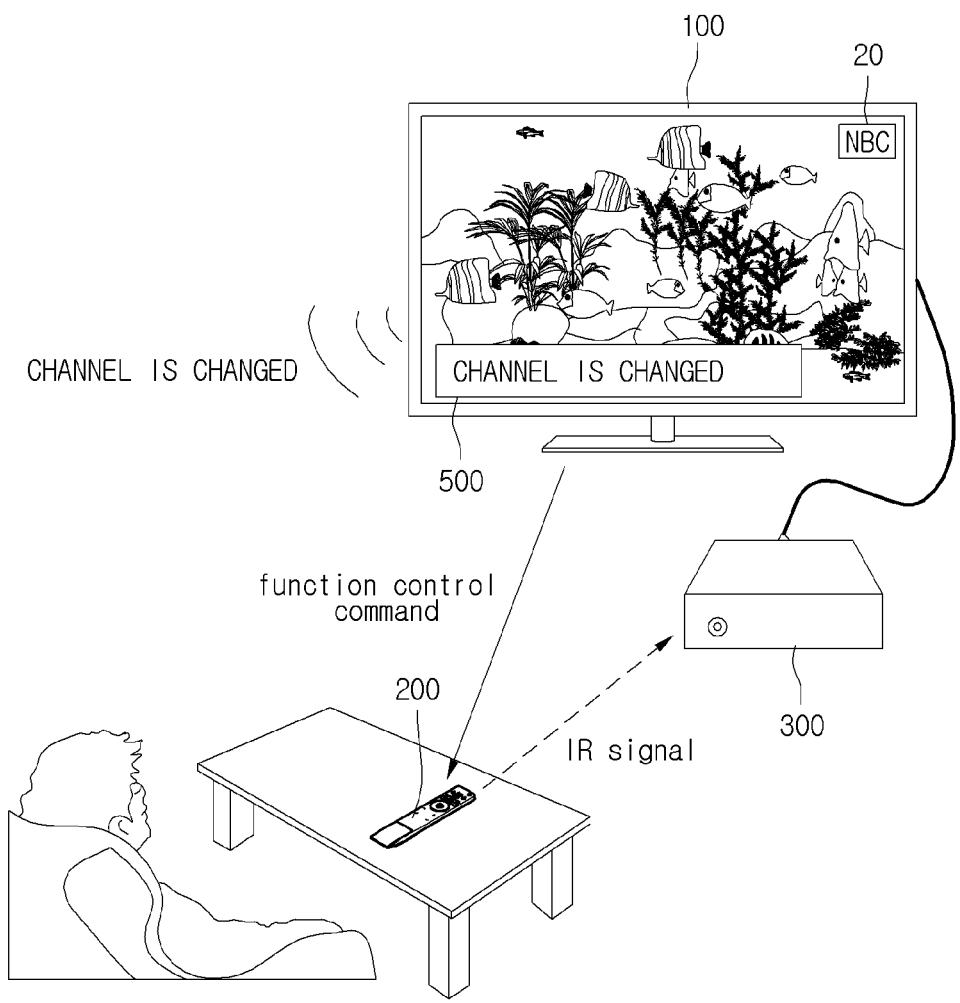

The display device 100 may output the channel change performance result of the peripheral device 300 through a message window and voice. That is, as shown in FIG. 11, the display device 100 may display the channel change performance result of the peripheral device 300 through the message window 500 and may output the voice of <channel is changed> at the same time.

According to an embodiment of the present invention, the display device 100 may receive a broadcast signal according to a channel change from the peripheral device 300 and may check a channel change state of the peripheral device 300 on the basis of the received broadcast signal. In more detail, the display device 100 may extract an image including the name of a channel or the name of a broadcast program from a broadcast image of a broadcast signal according to a channel change received from the peripheral device 300. The display device 100 may check the name of a channel or the name of a broadcast program by using the extracted image and may determine whether the peripheral device 300 performs a channel change function according to a confirmation result.

A user may easily check whether the peripheral device 300 operates normally only through a simple voice speech without manipulating the remote control device 200.

Then, FIGS. 12 to 15 are described.

FIGS. 12 to 15 are views of providing a control state of a peripheral device by recognizing a user's voice for volume adjustment according to an embodiment of the present invention.

Figure 12:
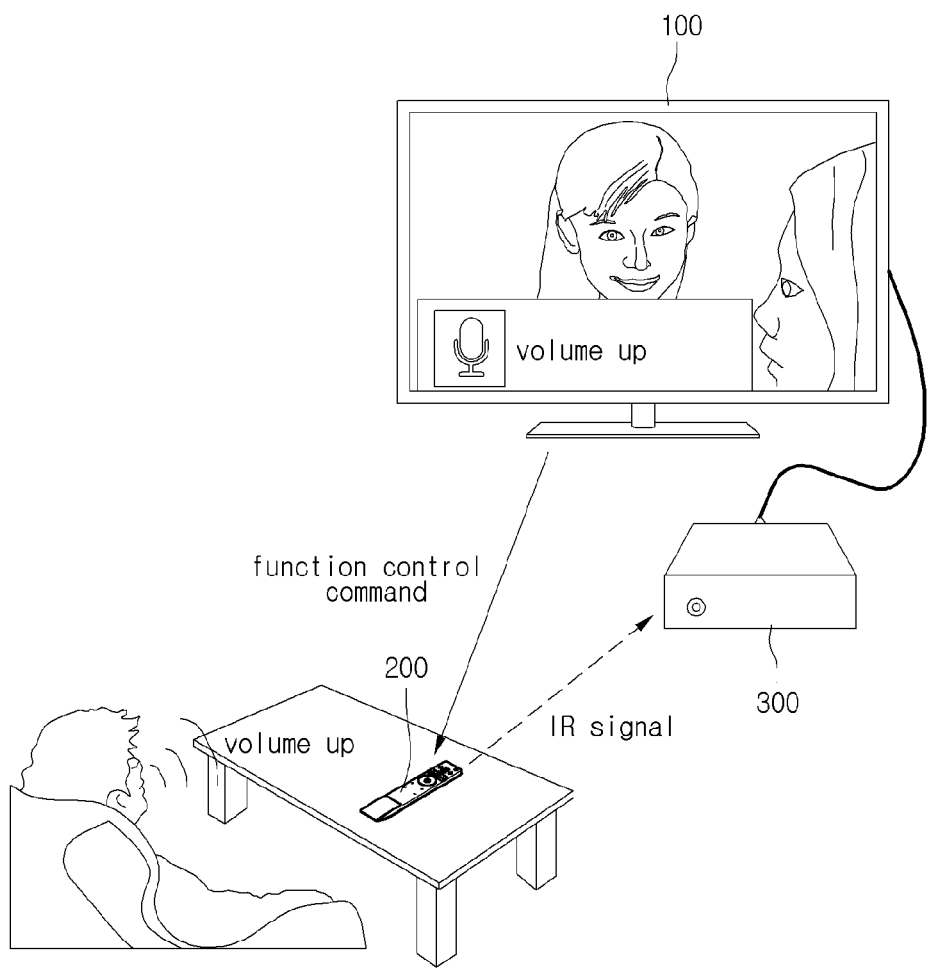
FIGS. 12 to 15 are views of providing a control state of a peripheral device by recognizing a user's voice for volume adjustment according to an embodiment of the present invention.

First, referring to FIG. 12, a user speaks the function control voice of <volume up> to control a volume adjustment function of the peripheral device 300. According to an embodiment of the present invention, a voice command for volume adjustment of the display device 100 and a voice command for volume adjustment of the peripheral device 200 may be different from each other. That is, <volume up> may be a voice command for volume adjustment of the peripheral device 300 and <sound up> may be a voice command for volume adjustment of the display device 100. This is just exemplary.

The display device 100 recognizes the spoken function control voice for volume adjustment and then transmits a function control command corresponding to the recognized function control device to the remote control device 200. Here, the display device 100 may output a function control voice representing the recognized volume adjustment through a screen.

The remote control device 200 generate an IR signal on the basis of the function control command for volume adjustment received from the display device 100 and transmits the generated IR signal to the peripheral device 300.

When receiving an IR signal normally, the peripheral device 300 performs a volume adjustment function corresponding to the IR signal and provides a performance result of the volume adjustment function to the display device 100.

According to an embodiment of the present invention, the control unit 170 of the display device 100 may detect the intensity change of an audio outputted through the audio output unit 185 to check whether the peripheral device 300 performs the volume adjustment function. In more detail, when the intensity of the audio outputted through the audio output unit 185 changes, the control unit 170 may confirm that the peripheral device 300 performs the volume adjustment function in correspondence to the user's function control voice for volume adjustment. When the intensity of the audio outputted through the audio output unit 185 does not change, the control unit 170 may confirm that the peripheral device 300 does not perform the volume adjustment function in correspondence to the user's function control voice for volume adjustment.

Figure 13:
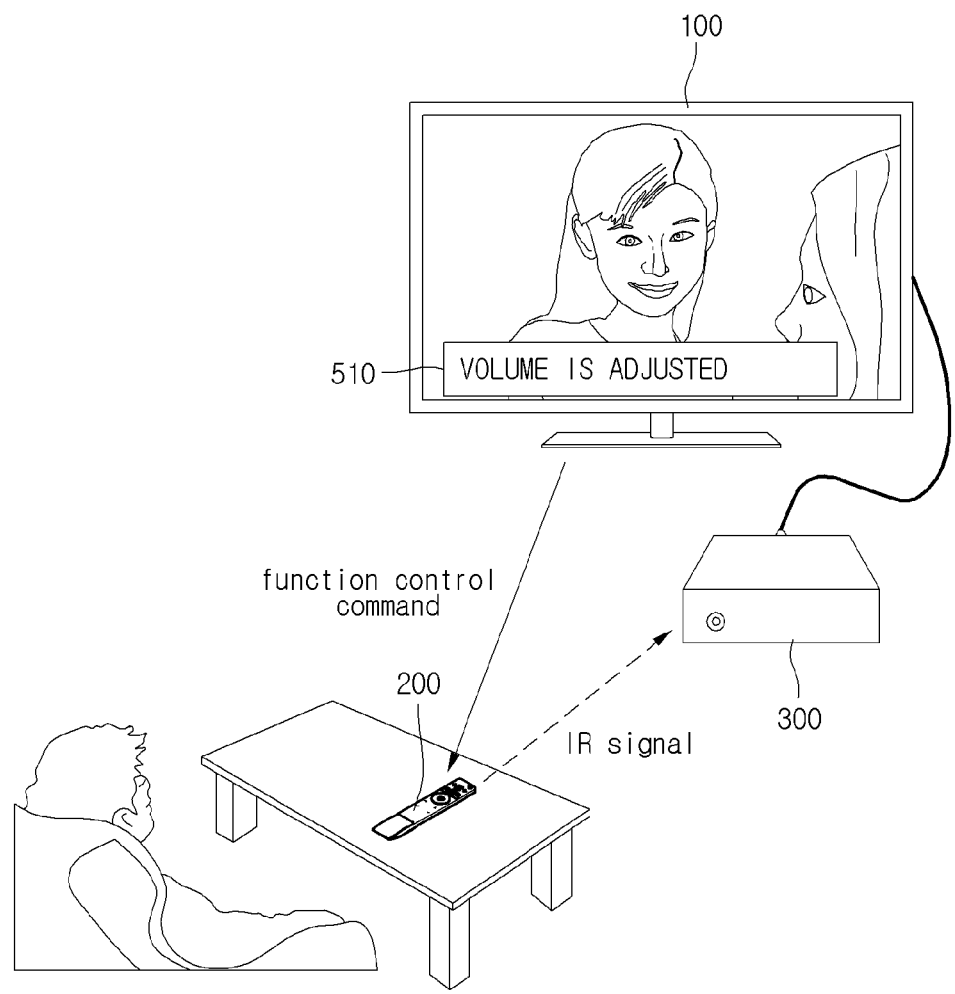

As shown in FIG. 13, when the intensity of the audio outputted through the audio output unit 185 changes, the display device 100 may display the volume adjustment performance result of the peripheral device 300 through the message window 510.

Figure 14:
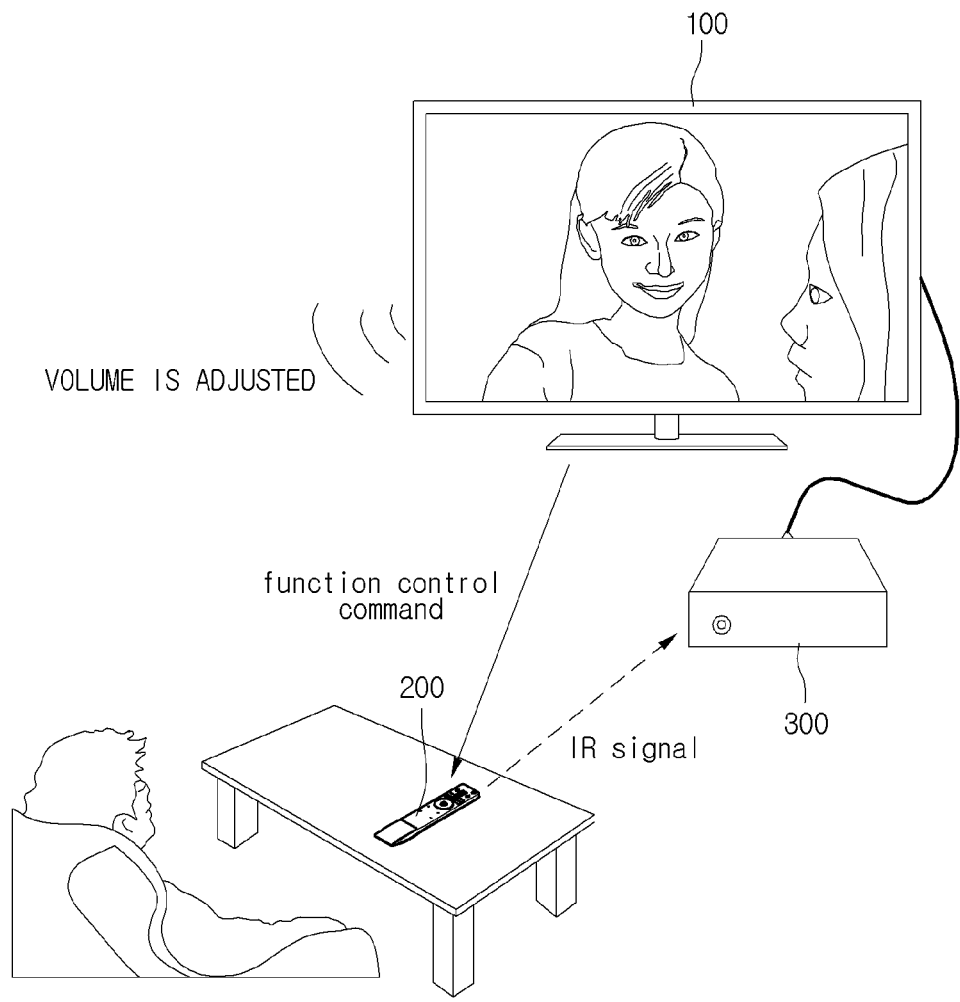

The display device 100 may output the volume adjustment performance result of the peripheral device 300 through voice. That is, as shown in FIG. 14, the display device 100 may output the voice of <volume is adjusted> through the audio output unit 185.

Figure 15:
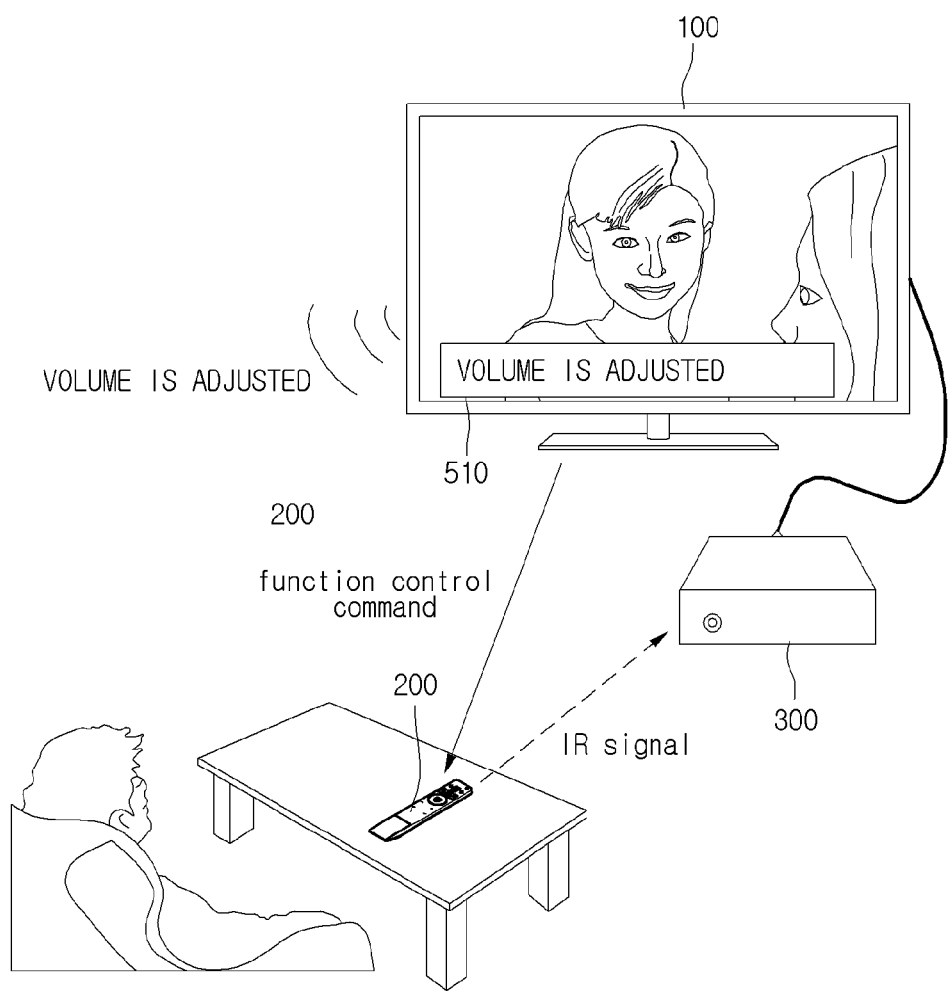

The display device 100 may output the volume adjustment performance result of the peripheral device 300 through a message window and voice. That is, as shown in FIG. 15, the display device 100 may display the volume adjustment performance result of the peripheral device 300 through the message window 500 and may output the voice of <volume is adjusted> at the same time.

Moreover, when the intensity of the audio outputted through the audio output unit 185 does not change, the display device 170 may confirm that the peripheral device 300 does not perform the volume adjustment function. Moreover, when the intensity of the audio outputted through the audio output unit 185 does not change, the display device 170 may confirm that the peripheral device 300 does not receive an IR signal from the remote control device 200 normally. In this case, the display device 100 may display the message window of <change direction of remote control device> and through this, may induce a user to change the direction of the remote control device 200 toward the peripheral device 300.

A user may easily check whether the peripheral device 300 operates normally only through a simple voice speech without manipulating the remote control device 200.

Then, FIGS. 16 to 19 are described.

FIGS. 16 to 19 are views of providing a control state of a peripheral device if the peripheral device does not receive an IR signal from a remote control device normally according to an embodiment of the present invention.

Figure 16:
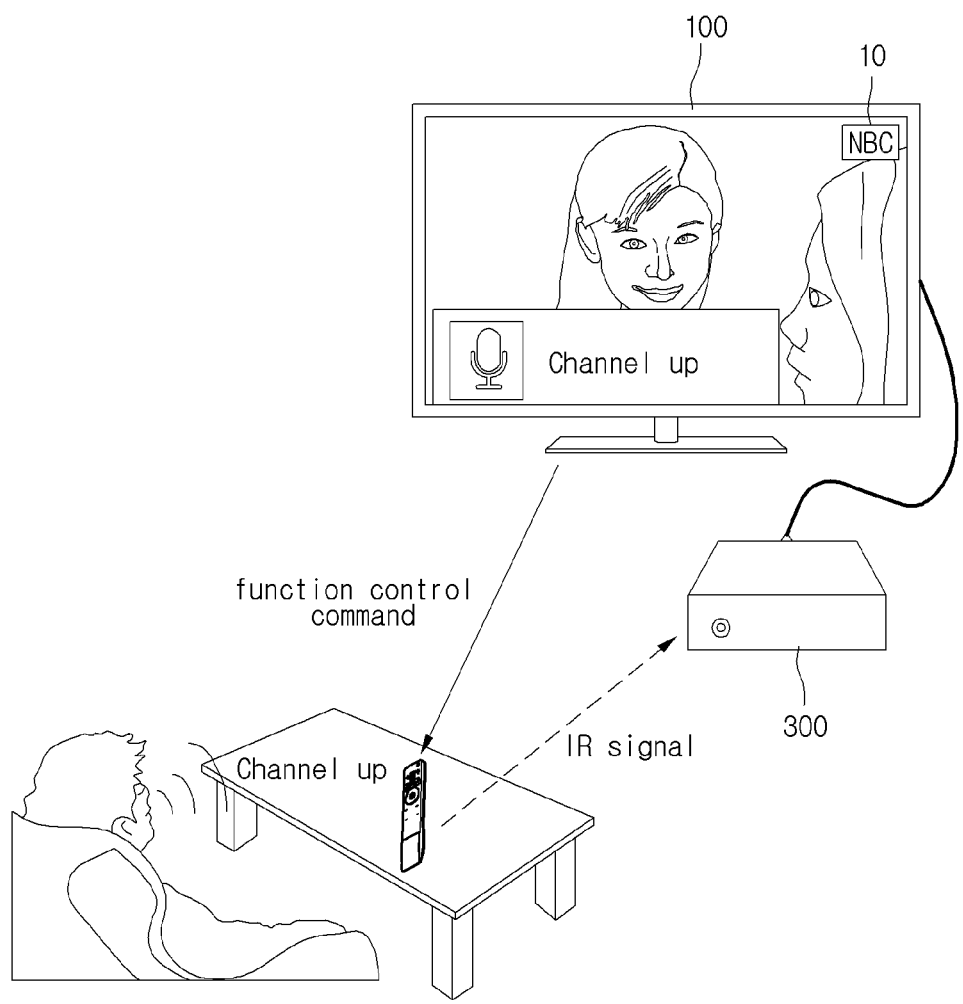
FIGS. 16 to 19 are views of providing a control state of a peripheral device if the peripheral device does not receive an IR signal from a remote control device normally according to an embodiment of the present invention.

First, referring to FIG. 16, a user speaks the function control voice of <channel up> to control a channel change function of the peripheral device 300. The display device 100 recognizes the spoken function control voice representing a channel change and then transmits a function control command corresponding to the recognized function control device to the remote control device 200. Here, the display device 100 may output a function control voice representing the recognized channel change through a screen.

The remote control device 200 generate an IR signal on the basis of a function control command on the basis of the function control command for channel change received from the display device 100 and transmits the generated IR signal to the peripheral device 300.

When not receiving an IR signal normally, the peripheral device 300 provides a feedback representing that the IR signal is not received normally to the display device 100. In more detail, if it is confirmed that the logo displayed on a playback screen of media content is not changed through a logo detection method, the display device 100 may confirm that the peripheral device 300 does not perform a channel change function. When the peripheral device 300 does not perform a channel change function in correspondence to a function control voice for channel change, the display device 100 may determine that the peripheral device 300 does not receive an IR signal from the remote control device 200 normally.

Figure 17:
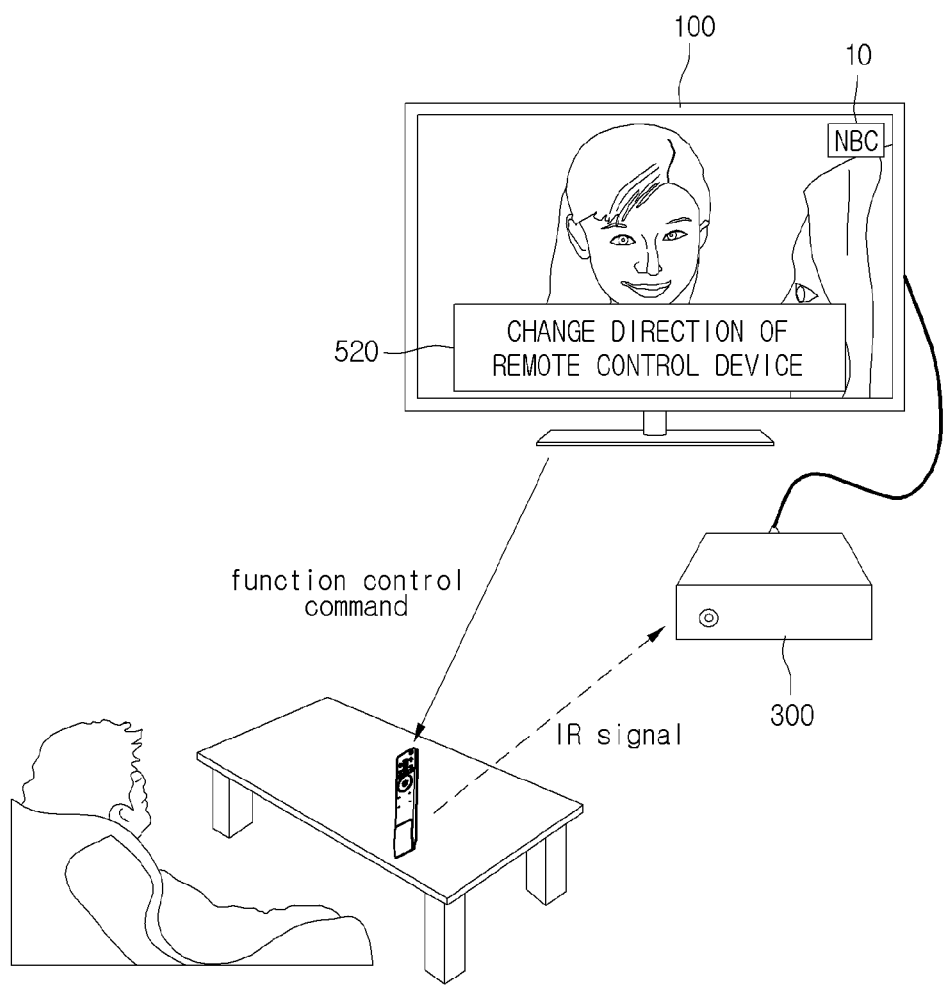

As shown in FIG. 17, when the peripheral device 300 does not receive an IR signal from the remote control device 200, the display device 100 may display the channel change performance result of the peripheral device 300 through the message window 520 of <change direction of remote control device>.

Figure 18:
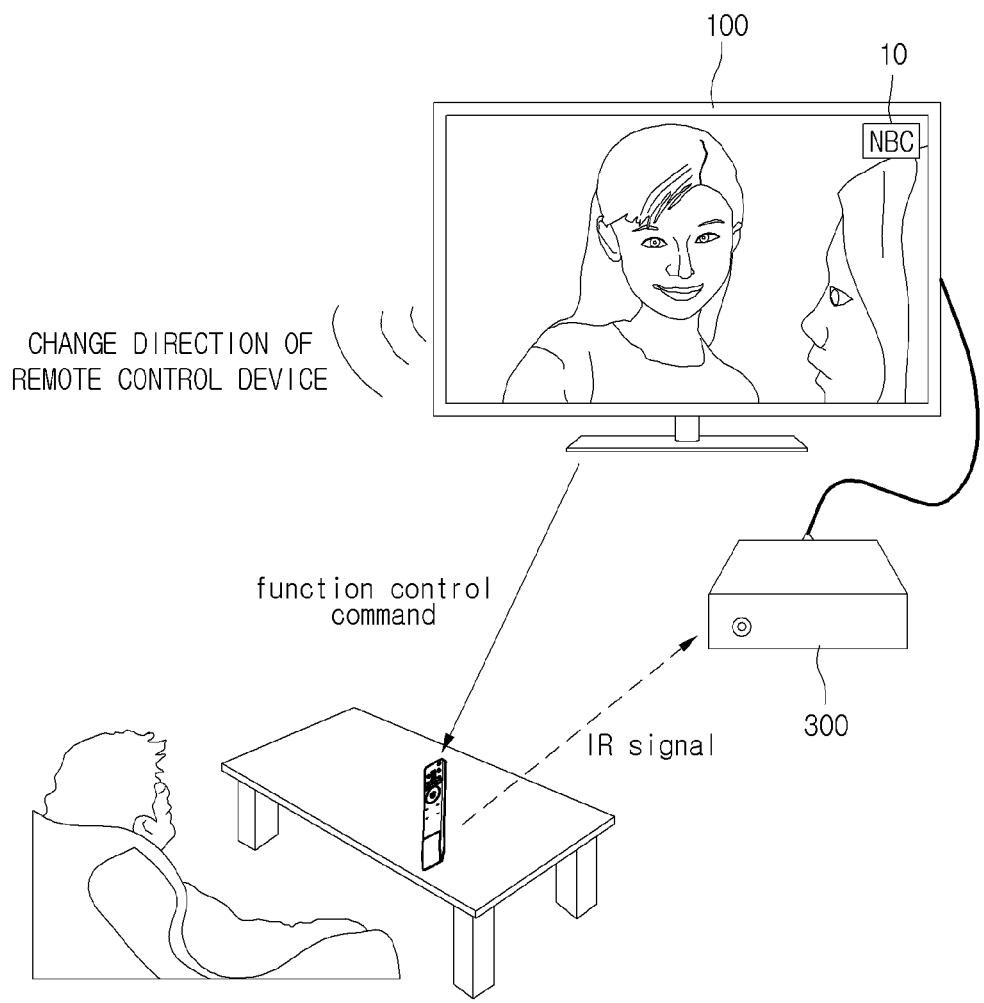

The display device 100 may output the channel change performance result of the peripheral device 300 through voice. That is, as shown in FIG. 18, the display device 100 may output the voice of <change direction of remote control device> through the audio output unit 185.

Figure 19:
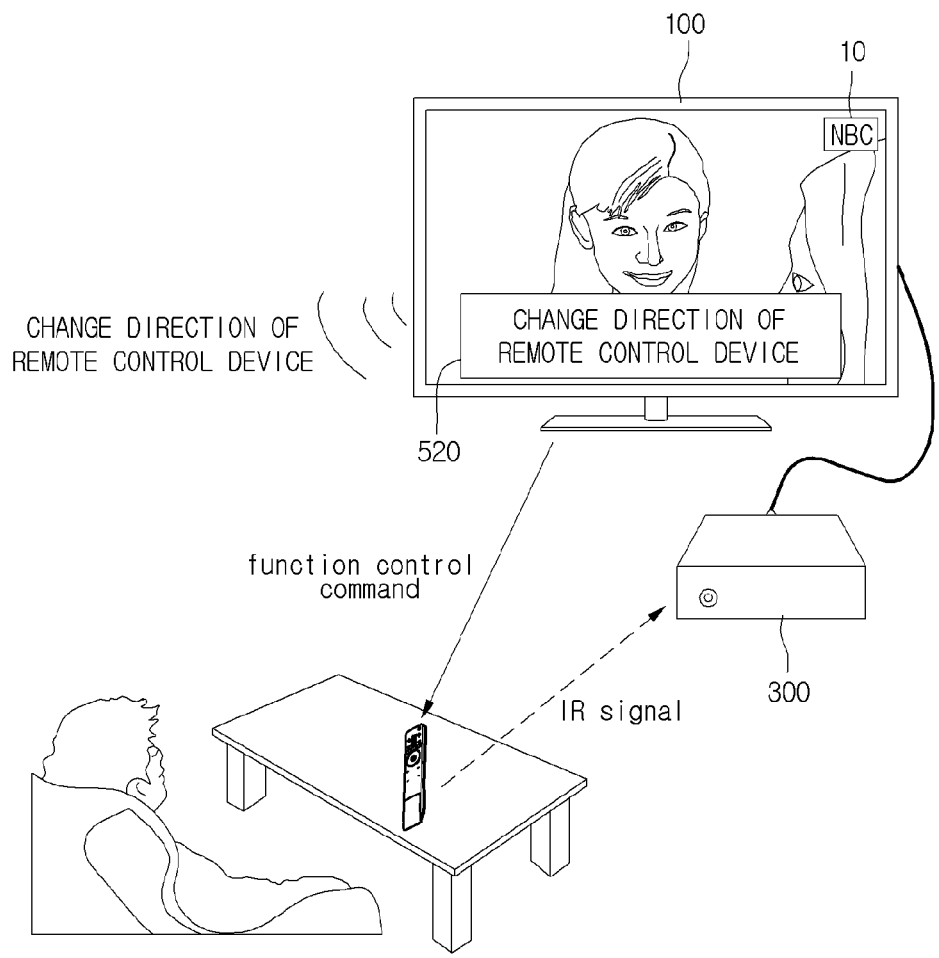

The display device 100 may output the channel change performance result of the peripheral device 300 through a message window and voice. That is, as shown in FIG. 19, the display device 100 may display the channel change performance result of the peripheral device 300 through the message window 500 and may output the voice of <change direction of remote control device> at the same time.

A user may change the direction of the remote control device 200 properly through the message window or voice outputted from the display device 100.

According to an embodiment of the present invention, the above method may be implemented on a program recorded medium as processor readable code. Examples of the processor readable medium may include ROM, RAM, CD-ROM, magnetic tape, floppy disk, and optical data storage devices and also may be implemented in a form of a carrier wave (for example, transmission through Internet).

In relation to the above-described display device, the configurations and methods of the above-described embodiments are applied without limitations and in order to provide various modifications, some or all of embodiments may be selectively combined and configured.

What is claimed is:

1. An operating method of a display device, the method comprising:
    recognizing, by the display device, a function control voice for controlling a function of a peripheral device;
    transmitting, by the display device, a function control command corresponding to the function control voice to a remote control device;
    detecting, by the display device, whether the function of the peripheral device corresponding to the function control command is performed; and
    displaying, by the display device, information representing a performance result of a function of the peripheral device based on a detection result.

2. The method according to claim 1, wherein the controlling of the peripheral device through the remote control device comprises:
    transmitting, by the display device, a function control command corresponding to the function control voice to the remote control device; and
    controlling, by the display device, the remote control device to transmit an IR signal corresponding to the function control command to the peripheral device.

3. The method according to claim 2, further comprising:
    outputting, by the display device, the information through an audio.

4. The method according to claim 3, wherein the displaying comprises
    if it is confirmed that the peripheral device does not receive the IR signal through the remote control device, displaying second information representing that the function of the peripheral device corresponding to the function control command is not performed.

5. The method according to claim 2, further comprising recognizing a user's trigger voice for activating a voice recognition function of the display device.

6. The method according to claim 5, further comprising transmitting a trigger control commend corresponding to the recognized trigger voice to the remote control device,
    wherein the trigger control command is a control command for changing an operation mode of the remote control device from a suspend mode to a low-power mode for receiving the function control command.

7. The method according to claim 1, wherein the displaying comprises
    if it is confirmed that the peripheral device receives the IR signal through the remote control device, displaying first information representing that the function of the peripheral device corresponding to the function control command is performed.

8. The method according to claim 1, wherein when the function corresponding to the function control voice is a channel change function, the displaying comprises:
    receiving, by the display device, a broadcast signal according to a channel change from the peripheral device;
    extracting, by the display device, an image from a broadcast image of the received broadcast signal; and
    detecting whether the channel change function is performed on the basis of the extracted image; and
    displaying the information representing a result of the channel change based on the detection result.

9. A display device comprising:
    a display unit;
    a user interface unit configured to perform the communication with a remote control device, and
    an external device interface unit configured to perform the communication with a peripheral device;
    a voice recognition unit configured to recognize a user's voice; and
    a control unit coupled with the interface unit and the voice recognition unit,
    the control unit is configured to:
    recognize a function control voice for controlling a function of a peripheral device,
    transmit a function control command corresponding to the function control voice to the remote control device,
    detect whether the function of the peripheral device corresponding to the function control command is performed, and
    display, on the display unit, information representing a performance result of the function of the peripheral device based on a detection result.

10. The display device according to claim 9, wherein the control unit controls the remote control device to transmit an IR signal corresponding to the function control command to the peripheral device.

11. The display device according to claim 10, further comprising:
    an audio output unit outputting the information through an audio.

12. The display device according to claim 11, wherein, if it is confirmed that the peripheral device receives the IR signal through the remote control device, the control unit is configured to display first information or output the first information representing that the function of the peripheral device corresponding to the function control command is performed through the audio.

13. The display device according to claim 11, wherein, if it is confirmed that the peripheral device does not receive the IR signal through the remote control device, the control unit is further configured to display second information or output the second information representing that the function of the peripheral device corresponding to the function control command is not performed.

14. The display device according to claim 11, wherein when the function corresponding to the function control voice is a volume adjustment, the control unit detects an intensity change of an audio outputted from the audio output unit and determines whether the peripheral device performs a volume adjustment function on the basis of the detected intensity change of the audio.

15. The display device according to claim 10, wherein the voice recognition unit recognizes a user's trigger voice for activating a voice recognition function of the display device.

16. The display device according to claim 15, wherein the control unit is further configured to transmit a trigger control command corresponding to the recognized trigger voice to the remote control device and the trigger control command is a control command for changing an operation mode of the remote control device from a suspend mode into a mode for receiving the function control command.

17. The display device according to claim 9, wherein, the function corresponding to the function control voice is the channel change function.

18. The display device according to claim 17, wherein the control unit is further configured to:
   receive a broadcast signal according to the channel change from the peripheral device,
   extract an image from a broadcast image of the received broadcast signal,
   detect whether the channel change function is performed based on the extracted image, and
   display the information representing a result of the channel change based on the detection result.

19. The display device according to claim 18, wherein, the extracted image includes a logo,
   if the logo is changed according to the function control voice, the control unit is configured to detect that the peripheral device performs the channel change function and,
   if the logo is not changed, the control unit is configured to detect that the peripheral device does not perform the channel change function.

20. The display device according to claim 9, wherein, when the function corresponding to the function control voice is a channel change function, the control unit transmits a sample of some frames of the media content to a contents recognition server, receives channel information of the media content from the contents recognition server, and determines whether the peripheral device performs a channel change function according to whether the channel information is changed.

21. The display device according to claim 9, wherein the control unit to transmit the function control command to the remote control device by using one of RF communication or Bluetooth communication.

* * * * *